United States Patent [19]

Lyons et al.

[11] Patent Number: 4,752,697
[45] Date of Patent: Jun. 21, 1988

[54] COGENERATION SYSTEM AND METHOD

[75] Inventors: James P. Lyons, Newark, Del.; Richard Topper, Glenside, Pa.

[73] Assignee: International Cogeneration Corporation, Phila., Pa.

[21] Appl. No.: 37,219

[22] Filed: Apr. 10, 1987

[51] Int. Cl.$^4$ ............................................. F02D 29/06
[52] U.S. Cl. ........................................ 290/2; 290/4 A
[58] Field of Search .................. 290/1 R, 2, 4 A, 4 R; 60/659

[56] References Cited

U.S. PATENT DOCUMENTS

| | | | |
|---|---|---|---|
| 3,703,663 | 11/1972 | Wagner | 317/13 R |
| 3,944,837 | 3/1976 | Meyers et al. | 290/40 R |
| 4,039,846 | 8/1977 | Vance | 290/4 R |
| 4,069,675 | 1/1978 | Adler et al. | 60/667 |
| 4,164,660 | 8/1979 | Palazzetti | 290/2 |
| 4,226,214 | 10/1980 | Palazzetti | 123/2 |
| 4,245,163 | 1/1981 | Philippe | 290/52 |
| 4,275,311 | 6/1981 | Agazzone et al. | 290/2 |
| 4,503,337 | 3/1985 | Hafner et al. | 290/2 X |
| 4,510,756 | 4/1985 | Hise et al. | 290/2 X |
| 4,517,468 | 5/1985 | Kemper et al. | 290/52 |
| 4,527,071 | 7/1985 | Ausiello | 290/2 X |

*Primary Examiner*—Charles D. Miller
*Assistant Examiner*—W. E. Duncanson, Jr.
*Attorney, Agent, or Firm*—Dilworth, Paxson, Kalish & Kauffman

[57] ABSTRACT

A cogeneration system including a heat engine driving an electrical generator coupled to electrical lines at a site serviced by a utility is disclosed. The system includes supervisory means for monitoring the electrical energy and/or power supplied by the generator, supplied to the site by the utility, and consumed by site electrical loads, for storing monitored electrical data, and for controlling operation of the engine and generator in response to the monitored data. The system further is provided with data representing the energy and power rate structure of the local utility, and with a real time clock, and stores monitored electrical data and controls operation of the system in accordance with whether the time corresponds to a utility peak, intermediate, or off-peak energy rate period or to a peak demand measuring period. The system further comprises means for monitoring the thermal energy transferred from the engine to a site thermal load by heat exchange means.

Also disclosed is circuitry for monitoring energy and power in electrical distribution lines and providing interlocking functions including means for multiplying voltage and current representative signals, a voltage-to-frequency converter for converting the product to a frequency signal, and a gated counter for integrating by counting the frequency signal over a predetermined time interval.

Also disclosed is a multiple-unit cogenerator system each unit of which is provided with supervisory means as set forth above, one of which serves as a local area network master controlling communicating with the others over a local area network. One unit serves as a lead unit, varying its output to regulate the system output. Other units are turned full on or off as necessary to provide the desired output. Lead unit status is rotated among the various units of the system to equalize wear.

A cogeneration method is disclosed including the functions of the apparatus set forth above.

16 Claims, 4 Drawing Sheets

COGENERATION SYSTEM AND METHOD

FIELD OF THE INVENTION

This invention relates to cogeneration systems, i.e., to systems which produce at a site electrical energy and possibly also thermal energy for use at the site. In particular, the invention relates to cogenerator control systems, and more particularly to cogenerator control systems which monitor cogenerator power output, power used at the site, and/or power supplied to the site by a utility, and control cogenerator operation in response thereto.

BACKGROUND OF THE INVENTION

The bulk of the electrical power consumed is provided by electrical utilities which utilize steam-driven turbines to drive generating means at central generating stations, and a network of transmission and distribution lines to distribute the power to widely dispersed sites where it is used. This method of power supply entails large energy losses. For instance, approximately 70% of the heat energy of fossil fuel burned at a central station is not utilized but is disposed of as waste heat. Further losses occur in the transmission and distribution of the electrical energy. These losses are reflected in the rates charged by electrical utilities.

In order to reduce electricity users' energy costs, so-called cogenerators have been provided. These cogenerators include a heat engine which drives electrical generating means, the output of which is coupled to the electrical lines servicing the electrical loads at the user's site. Such systems typically include one or more heat exchangers for distributing the heat output of the heat engine to thermal loads at the user's site, such as for heating of buildings. The use of such heat, which would otherwise be wasted, can raise the overall efficiency of utilization of the heat content of fuel to perhaps 80%; the energy cost savings to the cogenerator user are primarily attributable to reduction of energy costs for the uses, such as building heating, to which the cogenerator heat output is put.

However, known cogenerator systems are deficient in certain regards by failing to take into account the nature of the costs of using utility-supplied electricity. Utilities must provide generating, transmission, and distribution capacity sufficient to service the maximum total demand of all their connected customers. This demand tends to follow a daily cycle with a peak in the middle of the day, and a seasonal cycle, with a peak in the summer in moderate and warm climates, and a peak in the winter in colder regions. The equipment or generating capacity necessary to supply the peak demand is not always in use; nonetheless, the cost of having it available must be borne by the utility's customers. Utilities attempt to apportion such cost among their customers according to their respective peak usage by basing their electricity charges for individual customers upon their peak demand. For instance, utilities may charge different rates for electrical energy used during predetermined peak, intermediate, and off-peak periods during the day. Utilities may also impose a peak power demand charge based on the customer's peak power demand during a predetermined demand measuring period, such as during a 15 minute period each day. In addition to or instead of such peak demand charges, a utility may adjust its energy rates according to the customer's measured peak power demand. Moreover, utilities may base their rates and charges to a customer for an extended period such as an entire year on peak demand measured at a particular time, e.g. on a measured summer peak. Thus, heavy demand coinciding with a demand measuring period may grossly affect a customer's utility charges for that month, or even the following year. The customer's difficulty is compounded by the fact that utilities generally measure peak demand by peak-registering meters which are enabled during the demand measuring period and periodically read by the utility; the customer is therefore unable to determine when the peak occurred or verify what the peak in fact was. The customer has no means to control his demand and usage of utility power and energy or to verify the utility's basis upon which he is billed.

Known cogeneration systems, which lack the ability to control cogenerator operation in response to time of day and/or power being supplied to the site by the utility, cannot, for instance, ensure that the cogenerator is operating during peak rate periods or that it will control the peak usage of power from the utility. Such measures would significantly affect the customer's energy costs. Moreover, utility customers with cogeneration systems cannot determine the energy cost savings obtained by operation of the cogenerator, or whether in fact there are any savings. For instance, the apparatus set forth in U.S. Pat. No. 3,944,837 provides thermostatic control of the cogenerator and turns the heat engine on or off to control the temperature of the heat exchange medium, thereby matching the cogenerator thermal output to the site thermal demand. Such apparatus is entirely unresponsive to conditions affecting utility costs. For example, such apparatus may be inactive when there is low thermal demand but high electrical demand during a peak rate period, and be fully active when there is high thermal demand during an off-peak rate period. As a consequence, such systems do not optimize their operator's energy costs, particularly when their capital costs are taken into consideration. Known commercial systems also do not measure their power outputs, although some which operate at full output when on accumulate engine run time data, which when multiplied by the rated output, coarsely approximates total output.

SUMMARY OF THE INVENTION

It is therefore a general object of the invention to provide a cogeneration system which does not suffer the aforementioned drawbacks.

It is a more specific object of the invention to provide a cogeneration system which optimizes its operator's energy costs.

It is a further object of the invention to provide a cogeneration system which is responsive to utility rate structures.

It is a further object of the invention to provide a cogeneration system which is responsive to daily variations in utility rates.

It is another object of the invention to provide a cogeneration system which is responsive to the amount of power provided to a site by an electrical utility.

It is another object of the invention to provide a cogeneration system which monitors the quantity of thermal energy it supplies.

It is another object of the invention to provide a cogeneration system which monitors the quantity of electrical energy which it supplies, which is consumed at the site, and which is supplied to the site by a utility.

It is another object of the invention to provide a cogeneration system which documents such monitored quantities of thermal and/or electrical energy.

It is a further object of the invention to provide a cogeneration system which monitors the value of the thermal energy and of the electrical energy it supplies.

It is yet another object of the invention to provide a cogeneration system which is adapted to provide thermal and electrical output data to a remote location.

It is a further object of the invention to provide a cogeneration system which monitors its operating conditions and is adapted to provide data regarding same to a remote location.

It is still a further object of the invention to provide a cogeneration system which is operable from a remote location.

It is another object of the invention to provide a cogeneration system according to the foregoing objects which is capable of reliable autonomous operation.

It is a further object of the invention to provide a cogeneration system according to the foregoing objects which includes a plurality of cogenerators.

In accordance with the foregoing objects, the cogeneration system of the present invention includes heat engine means, generator means mechanically coupled thereto and electrically coupled to site electrical distribution lines, and heat transfer means for transferring heat from the engine means to site thermal loads. The cogeneration system includes supervisory means for monitoring and controlling the operation of the system, including means for monitoring the electrical energy and power supplied to the site by the utility, supplied by the generator means, and consumed by the site load. The supervisory means further includes real time clock means, and operation of the engine means is controlled in response to the monitored electrical energy and to the clock means.

In a preferred embodiment, the supervisory means of the present invention comprises a central processor and associated memory for storage of acquired data and system operating software.

These and other objects and features of the invention will become apparent to one skilled in the art upon review of the following specification, appended claims, and drawings.

DETAILED DESCRIPTION OF THE PREFERRED EMBODIMENT

Figure 1:
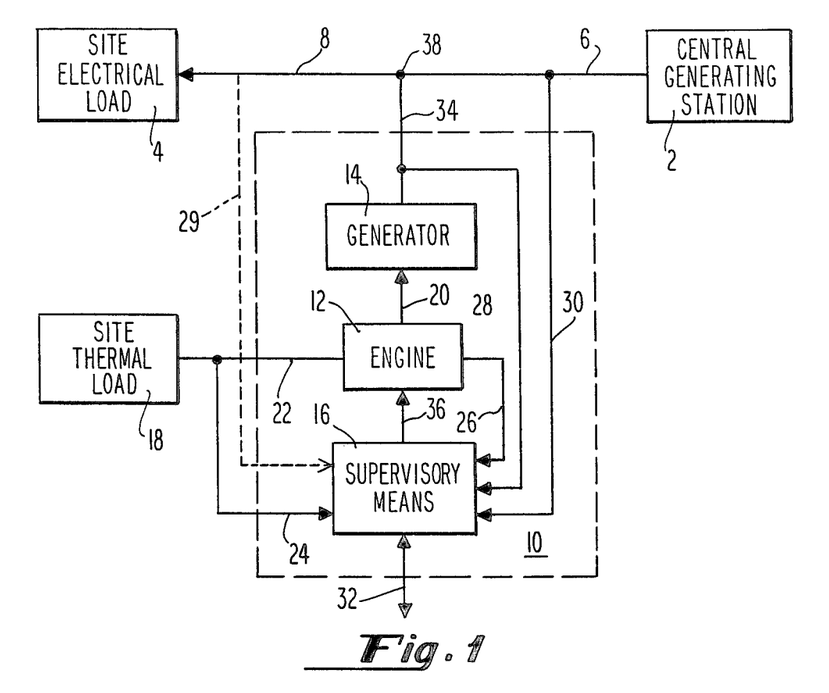
FIG. 1 is a simplified schematic diagram of the cogeneration system of the present invention.

FIG. 1 is a simplified block diagram of the cogeneration system of the present invention illustrating its basic components and the environment in which they are used. Normally, electrical service is provided to a site by a utility central generating station 2 over utility distribution lines 6. At the site, power is supplied to electrical loads 4 by site distribution lines 8 coupled to utility lines 8. In known cogeneration systems, heat engine means such as an internal combustion engine 12 is provided, the mechanical output 20 of which is coupled to electrical generator means 14 such as a generator or alternator. The electrical output of generator means 14 is coupled by generator output distribution lines 34 to the site distribution lines 8 at node 38 to supply some or all of the electrical load 4, and the heat output 22 of engine means 12 is coupled to site thermal load 18, typically by means of a heat exchanger (not shown) whereby the otherwise-wasted thermal energy may be put to use.

To the foregoing, the cogeneration system 10 of the present invention adds supervisory means 16 for controlling the operation of the system. Supervisory means 16 provides control outputs 36 to engine means 12 in response to input data 30 relating to the electrical energy and/or power transferred between central generating station 2 and the site (hereinafter utility energy or power or, collectively, utility electricity) over distribution lines 6, and input data 28 relating to the electrical energy and/or power 34 transferred between generator 14 and site distribution lines 8 (hereinafter generator energy or power or, collectively, generator electricity). In addition to or in lieu of input data 28 or 30, supervisory means it may be provided with input data 29 relating to the electrical energy or power consumed by load 4 (hereinafter load energy or power or, collectively, load electricity), and provide control inputs 36 in response to the load electrical data. Supervisory means 16 also desirably receives input data 24 relating to thermal energy and/or power transferred from engine means 16 to thermal load 18, and provides control inputs 36 in response to the thermal input data. Further, supervisory means 16 desirably receives operating condition data 26 from engine means 12, and provides control inputs 36 in response to the operating condition data. Supervisory means 16 comprises data storage means for storing electrical data, thermal data, and operating condition data. Supervisory means 16 also desirably includes means for input and output of data 32 to local and/or remote terminals and the like.

Figure 2:
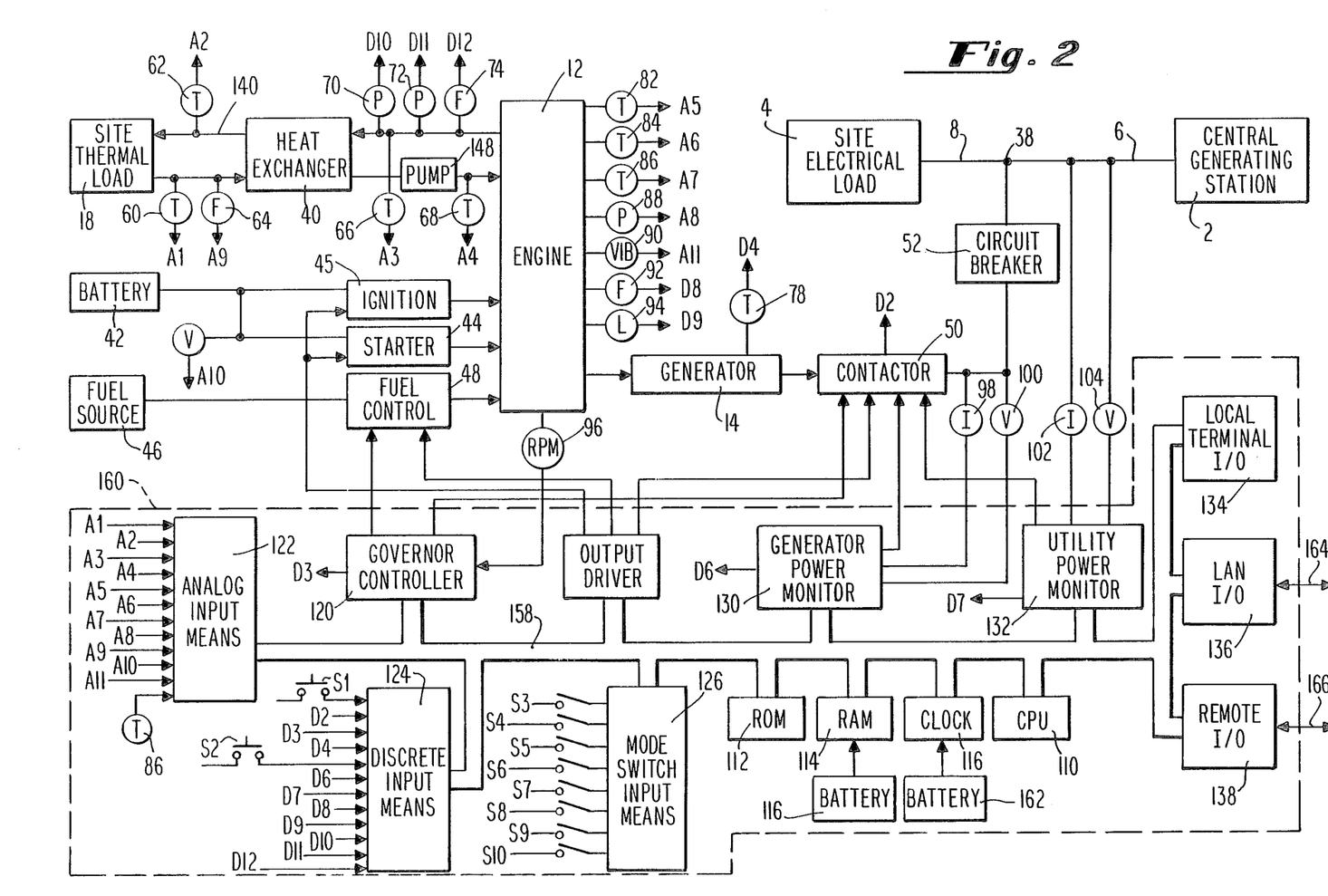
FIG. 2 is a more detailed schematic diagram of the cogeneration system of the present invention.

FIG. 2 shows a more detailed schematic representation of the preferred embodiment of a cogeneration system according to the present invention.

In the system of FIG. 2, the supervisory means 16 of FIG. 1 is shown in detail, and comprises sensor means 60, 62, 64, . . . 104; output devices for system control, including fuel control means 48, contactor 50, starter means 44, ignition means 45, and circulating pump 148; and the elements contained within dotted block 160, hereinafter referred to as control means 160. Engine means 12 is supplied fuel, such as natural gas, from a fuel source 46 via a fuel control means 48. Fuel control means 48 may comprise a carburetor adapted to be controlled by signals from supervisory means 16, such as a carburetor having its throttle actuated by a stepper motor. It may further comprise a solenoid-operated value to turn the fuel supply on or off. A storage battery 42 provides power to enable starter means 44 to turn engine means 12 over under control of a start signal from control means 160, and to ignition means 45 under control of an ignition signal from control means 160. Storage battery 42 also desirably provides power to supervisory means 16, enabling it to operate whether or not power is available from generator means 14 or central generating station 2.

Generator means 14 is an induction generator, operating above synchronous speed to deliver output power. For instance, generator means 14 may deliver no power at a synchronous speed of 1800 RPM, and maximum power output at a speed of 1845 RPM. The electrical output of generator means 14 is coupled to site distribution lines 8 at node 38 through a contactor 50 and a circuit breaker 52. Contactor 50 enables the generator output to be coupled to and decoupled from lines 8 during startup and shut down, respectively, under the control of control means 160 (and under control of protective interlocks, as discussed hereinafter). Contactor 50 provides an auxiliary interlock discrete signal D2 to indicate whether the contactor is closed or open. Circuit breaker 52 protects the cogeneration system from line faults such as a short circuit overload.

Thermal output from engine means 12 is coupled to thermal load 18 by heat exchanger 40. A heat transfer fluid such as water is circulated (by means not shown) between the thermal load 18 and the output of heat exchanger 40 in a customer loop via supply line 140 and return line 142. While the heat input to exchanger 40 may be obtained directly from any convenient elevated-temperature portion of engine means 12, desirably it is obtained from another heat exchange fluid circulated by pump 148 in an intermediate loop having a supply line 144 and return line 146. The intermediate loop may pass through heat exchangers (not shown) thermally coupled to the engine coolant, the engine oil, the exhaust manifold, and the exhaust gases and thereby recover a large portion of the heat output of engine means 12. Thermal load 18 may compromise building space heating loads, industrial process heat supply loads, hot water supply loads, and other load devices requiring a heat input such as certain types of air conditioners and the like. For example, the heat output of the cogeneration system may be supplied to heating and cooling units operating by dessicant heating or absorption chilling.

Control means 160 generally acquires input data from the sensors, performs computations based on or other manipulation of the input data, stores acquired data and data derived therefrom, controls operation of the engine and the electrical and thermal output of the system by providing output signals to the output devices, and interchanges data with one or more terminals. The elements of control means 160 are coupled to one another by data/address bus means 158. CPU 110 controls the flow of data between the elements of control means 160, and performs computations on and otherwise manipulates such data in accordance with a stored control program. The control program is stored in ROM 112; portions may also be stored in RAM 114, enabling such portions to be altered by input from local terminal 134 or a remote terminal. RAM 114 also stores operating condition data, operating history data, and electrical and thermal power and energy data. In order to preserve the stored control program portions and data despite failure of the power supply from battery 42, RAM 114 is provided with a backup battery 116.

Sensors providing analog outputs are coupled to bus means 158 by analog input means 122, which provides signal conditioning appropriate for the particular analog sensors used and analog to digital conversion of the conditioned analog input signals. Discrete signals from discrete-output sensors, fault-responsive interlocks, and certain operator-actuated switches are coupled to bus means by discrete input means 124. Discrete input means 124 provides appropriate signal conditioning for the various discrete inputs, such as optical isolation of the discrete inputs. The analog and digital input signals from inputs means 122 and 124 are periodically scanned by CPU 110 and stored, as are the data inputs from governor controller 120 and power monitor means 130 and 132. In this way, present operating condition data regarding the cogeneration system is maintained in RAM 114.

Control outputs to control the thermal and electrical outputs of the operation of the engine means 12 and generator means 14 are provided by output driver means 128 to the output devices. Such outputs include starting control outputs to starter 44, ignition outputs to ignition means 45 and contactor control outputs to contactor 50. Output means 128 includes means for converting control data present on bus 158 to output signals of the form required to actuate the output devices.

Control means 160 further includes governor control means 120, generator power monitor means 130, and utility power monitor means 132. The inputs of these elements could be supplied to the analog input means 122, and their functions performed by CPU 110 and output driver means 128 under the control of a stored program. However, such an approach would require sufficient CPU time to perform the power monitoring and governor functions that they and other control means functions would in general operate excessively slowly. Therefore, in the preferred embodiment shown in FIG. 2, the power monitoring and governor functions are provided by separate dedicated circuit assemblies functioning as intelligent slaves to CPU 110. They each comprise a CPU, ROM, and RAM.

Governor controller 120 receives an engine speed-related input from RPM sensor 96. RPM sensor 96 may comprise a magnetic pickup sensing the passage of teeth of the flywheel of engine means 12. Governor controller 120 is periodically scanned by CPU 110 which inputs RPM data from controller 120. CPU 110 computes an updated engine speed setpoint to satisfy power output demand in response to the speed input data in accordance with a stored feedback control program, and transmits the updated speed setpoint to governor controller 120. Governor controller 120 transmits fuel control output signals to fuel control means 48 in accordance with the speed setpoint data received and a stored program. Thus the power output of the cogeneration system may be feedback controlled (in modes described more fully hereinafter) by the supervisory means of the present invention. Desirably two sets of speed control coefficients used in generating fuel control outputs are stored in memory in governor controller 120. One of the sets is used when the generator is on-line, and the other set is used when the generator is off-line, in order to obtain effective speed and power control in either state. Governor controller 120 also monitors for overspeed and underspeed alarm conditions of engine means 12 by comparison of RPM inputs from sensor means 96 with stored underspeed and overspeed setpoints. In response to detected overspeed or underspeed alarm conditions, alarm data representing same is generated and transmitted to CPU 110 when governor controller 120 is polled by CPU 110. Governor controller 120 also desirably directly controls contactor 50 to decouple generator 14 from the distribution lines immediately upon detection of an alarm. This is desirably accomplished by an interlock comprising governor-controlled relay contacts in series with the contactor coil; a discrete output signal D3 indicates the status of the interlock, i.e. whether governor controller 120 has detected an alarm condition. Alternatively, of course, CPU 100 may cause output driver 128 to generate the contactor-opening output in response to such discrete alarm input D3.

In accordance with an important aspect of the invention, the supervisory means 16 monitors thermal power and/or energy supplied to load 18. Temperature sensors 62 and 60 measure the temperatures of the heat transfer fluid in supply line 140 and return line 142, respectively, of the customer loop and flow sensor 64 measures the flow therethrough. The analog outputs A1, A2 and A9, respectively, of these sensors are supplied to control means 160 via analog input means 122. CPU 110 acquires data representing these temperature and flow variables as it periodically scans the analog inputs, computes the temperature difference, and multiplies this difference by the flow rate to compute thermal power being delivered to load 18. CPU 110 also integrates the computed thermal power to compute thermal energy delivered to load 18. Measured and computed thermal data are stored in RAM 114.

RAM 114 may also be provided with data representing the per-unit cost of thermal energy at the site, in which case the control means may also compute the value of the thermal energy provided by operation of the cogeneration system. Alternatively, the thermal energy data may be transmitted to a remote location via remote I/O means 138, and the value of thermal energy computed there; the raw temperature and flow data may even be transmitted to a remote location, and all computations performed there.

In accordance with another important aspect of the invention, control means 160 includes means for monitoring the electrical power and energy supplied to distribution lines 8 by generator means 14 and by central generating station 2. It should be noted that the electrical power and energy consumed by load 4 is equal to the sum of the power and energy supplied by generator means 14 and by central generating station 2, and thus monitoring these variables at any two of these locations enables computation and monitoring of the variables at the third. Thus, all electrical variables may be monitored by directly monitoring utility data 30 and load data 29 and computing generator data; by directly monitoring load data 29 and generator data 28 and computing utility data; as shown in FIG. 2 by directly monitoring utility data 30 and generator data 28 and computing load data; or by directly monitoring data 28, 29 and 30. In practice, it is preferable to directly monitor the generator and utility electrical data, and compute the load electrical data. Direct monitoring of generator output enables better control over cogenerator operation. Direct monitoring of utility data permits direct detection of utility faults requiring control action, and since utility data is to be controlled in certain modes of operation of the cogeneration system, its direct monitoring is advantageous. Also, in reality electrical loads are distributed along lines 8 rather than lumped as shown in the scheme of FIG. 2. Direct monitoring of the generator and utility data and computation of the load data permits the cogenerator output to be coupled to the distribution line 8 at any point thereof, and the load, utility and generator data monitored with measurements at only two places. If load data were monitored rather than computed in such a system, multiple load monitoring devices would generally be required. Thus, while directly monitoring the electrical data of any two of the locations and computation of the data at the third are functional equivalents and equivalent to monitoring data at all three places, the apparatus of FIG. 2 has practical advantages.

At the points where electrical data is to be monitored, voltage and current sensors are coupled to the electrical lines. Voltage sensor 100 and current sensor 98 provide generator output voltage and current signals to generator power monitor means 130, and voltage sensor 104 and current sensor 102 provide utility voltage and current signals to utility power monitor means 132. Current sensors 98 and 102 desirably comprise current transformers, and voltage sensors 100 and 104 desirably comprise potential transformers, thereby providing frequency and phase information as well as amplitude information to the power monitoring means. In general, the power lines will be threephase lines, and the voltage and current sensors will comprise sensors for each phase.

Figure 3:
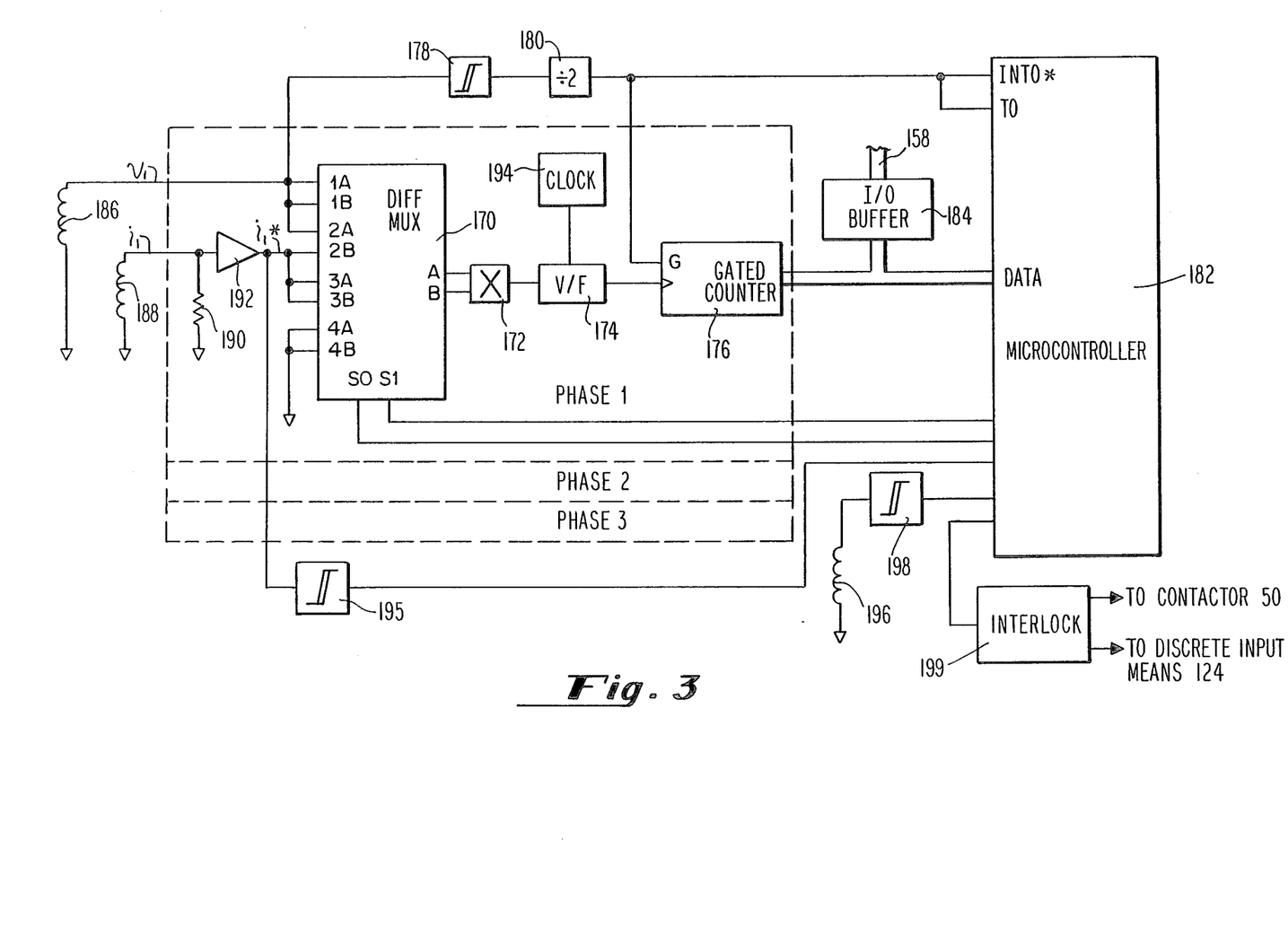
FIG. 3 is a schematic diagram of a preferred embodiment of power monitoring circuitry useful in the present invention.

Power monitor means 130 and 132 each comprise means for computing the power in their associated lines on the basis of their voltage and current input signals. Desirably, the power is computed by integrating the product of the voltage and current signals over an integral number of line cycles. A preferred form of power computation circuitry is shown in FIG. 3 and described hereinafter. Data representing electrical power is presented to bus 158 by monitoring means 130 and 132 when the monitoring means are polled by CPU 110, and the electrical power data is stored in RAM 114. CPU 110 computes and stores the electrical energy supplied by the generator and the utility over a predetermined time period by integrating the power data over such period. Alternatively, of course, the electrical energy may be computed by monitoring means 130 and 132, and presented as data to bus 158.

In accordance with another important aspect of the invention, RAM 114 contains data representing the electrical rate structure of the utility supplying the site, and control means 160 includes real time clock means 118 for supplying real time signals to bus 158. In the supervisory means of the present invention, these elements permit documentation of the basis for utility billings of the site and of the basis for what the utility billings would have been absent the cogeneration system, and thus, of the basis for the economic benefit obtained by the site owner by virtue of the cogeneration system. The stored rate structure data includes data representing the times at which different energy rates are in effect, e.g. the times of peak, intermediate, and off-peak rates. Data representing utility, generator, and load energy is separately accumulated in RAM 114 separately for peak, intermediate, and off-peak periods, as determined by comparison of the real time data from clock means 118 with the stored utility rate structure data. Separate accumulation of the energy data enables computation, by multiplication of the peak, intermediate, and off-peak utility energy usage by the peak, intermediate, and off-peak utility rates, of the value of electrical energy supplied by the utility, i.e. documentation and verification of the basis for utility energy billing. Also, by an analogous computation based on the peak, intermediate, and off-peak electrical energy consumption by site load 4, the value of electrical energy consumed by the site may be documented and verified.

Since the entire site consumption would have been supplied by the utility if the cogeneration system were not present and operational, the difference between the above values represents the savings occasioned by the cogeneration system in utility energy billings. If utility billings are based solely on energy usage, then the savings occasioned by the cogeneration system may be computed solely on the basis of the generator energy data. Such computations may be performed by CPU 110 if provided with data representing the peak, intermediate, and off-peak rates; if not, computing means elsewhere may perform such computations based on output of the energy data stored in RAM 114.

Also included in the stored utility rate structure data in RAM 114 is data representing the time during which the utility measures peak site demand. During such times, as determined by comparison by CPU 110 of real time data from clock means 118 with the stored peak demand measuring times, CPU 110 monitors power data from monitoring means 130 and 132 and stores data representing the peak utility power and load power occurring during such demand measuring periods. Such data enables computation of the demand charges which will be incurred due to actual site demand, and of the demand charges which would have been incurred had the cogeneration system not been present and operational during the demand measuring period, i.e. based on total site demand. As has been noted, such demand charges may be effected by direct charges or by adjustments to energy rates or both. If RAM 114 is provided with utility rate structure data representing the mode of demand charging, CPU may compute the effect of site demand by computing adjustments to energy rates based on demand or by computing direct demand charges; alternatively, of course, such computations may be made elsewhere based on the stored data representing load and utility power during demand measuring periods.

In accordance with the above, the congeneration system of the present invention, by monitoring peak, intermediate, and off-peak utility and load power, and monitoring utility and load power during demand measuring periods, enables computation and documentation of the effect on utility billings of operation of the cogeneration system. Further, monitoring these parameters enables the system of the present invention to effect strategies to minimize utility billing, by operating in control modes wherein these parameters are controlled.

In accordance with control mode data stored in RAM 114, such as may be input as a setup parameter by an operator, the cogeneration system of the present invention may operate in an automatic mode and in a maximum mode. In the maximum mode, when the generator means 14 is coupled to the line, the speed setpoint transmitted to governor controller 120 is a setpoint for maximum power output, which setpoint is stored in RAM 114 as a setup parameter. The maximum mode is appropriate when there is an agreement between the utility and the site owner for the utility to buy power from the site and it is economically advantageous for the site to sell excess power. When the generator output at maximum exceeds the demand of site load 4, the excess power generated will flow from the site to the utility over utility distribution lines 6. Normally, however, the system will be operated in the automatic mode, wherein the generator output is feedback controlled. Generally, the output condition to be achieved by feedback control is where the generator 14 supports the entire load 4, i.e. no power delivered from the utility to the site and no reverse power delivered to the utility from the site. In the automatic mode, utility power data is periodically input by CPU 110 when polling utility power monitor means 132. CPU computes an updated speed setpoint based on the utility power so as to adjust the utility power to zero and transmits the setpoint to governor controller 120, which outputs the appropriate fuel control signals to fuel control means 48. Desirably, CPU 110 computes updated setpoints in accordance with a proportional-integral-derivative (PID) algorithm according to PID parameters stored in RAM 114. If generator 14 is unable to support the entire load 4, the speed setpoint will increase to its maximum-output value, and excess power demanded by load 4 will be supplied by the utility.

By comparison of real time data with the data representing the time of peak energy rate periods, CPU 110 may control the system to be on-line (in either mode) during such peak energy rate periods, when the economic benefit to the site owner of a kilowatt-hour supplied by the cogeneration system is the greatest. Also, by comparison of real time data with stored demand measuring period data, CPU 110 may control the system to be on-line during such demand measuring periods, when the economic benefit to the site owner of a kilowatt supplied by the cogeneration system is the greatest. When on-line during demand measuring periods, supervisory means 16 may operate in either the peak mode or the automatic mode; if in the automatic mode, instead of regulating to achieve a zero utility power condition, it may regulate to a nonzero utility power setpoint which is either stored as a setup parameter or determined by CPU 110 as the highest peak utility power registered during demand measuring periods over a preceding time interval.

Real time data from clock means 118 also permits data, such as alarm event data, power and energy data, and data representing operationally significant events, to be stored in association with data representing the time of occurrence of such events. Such data can be extremely useful in analyzing system operation and diagnosing system faults, malfunctions, or other operational anomalies.

Figure 2A:
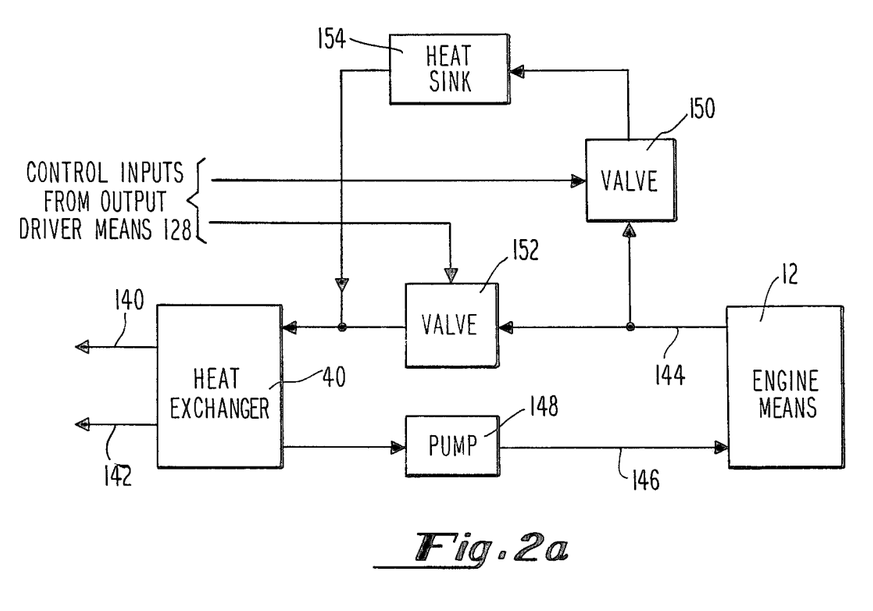
FIG. 2a is a diagram of intermediate loop apparatus useful in the system of FIG. 2.

In either of the above control schemes wherein electrical output is controlled, operation of the cogenerator to produce the required electrical output may produce more thermal power output than is required to satify the demand of thermal load 18. In this situation, either the cogenerator must be shut down or the excess thermal output must be accounted for. To this end, the intermediate loop apparatus shown in FIG. 2a, including valves 150 and 152 and heat sink means 154, may be provided. When thermal load 18 can absorb the entire output of the cogenerator, valve 152 is open and valve 150 is closed to permit the entire heat output of the congenerator to be supplied to heat exchanger 40. When the thermal load 18 cannot absorb the output of the cogenerator, control outputs from output driver means 128 cause valve 152 to close and valve 150 to open, diverting intermediate loop heat transfer fluid to heat sink means 154. Heat sink means 154 may comprise a radiator to dispose of the excess heat, or an accumulator such as fluid reservoir to store the excess heat. Stored excess heat may be supplied to heat exchanger 40 when load thermal demand is greater than cogenerator output, or when thermal output is required and the engine means 12 is off. It will be understood that the apparatus of FIG. 2a, operating as described, is merely an example of means for removing heat output in excess of demand from the cogeneration system, and that other arrangements and components to provide this function, such as proportional value control or a separate fluid loop for heat storage, will no doubt occur to one skilled in the art.

As an alternative to the above control schemes wherein the electrical output of the cogenerator is the primarily controlled variable, the supervisory means 16 may also primarily control the thermal output of the cogenerator, data being stored in RAM 114 to designate the control mode as thermal or electrical. Thus, an analog temperature sensor or thermostat may provide analog or discrete inputs to control means 160 relating the thermal demand of load 18, and CPU 110 may generate control outputs via output driver 128 to control operation of engine means 12 in an on-off (maximum mode) or continuously varying (automatic mode) fashion so as to satisfy the thermal demand. Thermal demand inputs may be provided by temperature sensors 60 and/or 62 in the customer loop, or by sensors (not shown) provided at the load 18. When such a thermal control scheme is employed, the apparatus of FIG. 2a need not be provided, but may still be useful, for example, if the peak thermal demand is greater than the maximum congenerator thermal output, but the average thermal demand is less than the maximum output.

In order for a cogeneration system to provide the greatest energy cost savings, it must be available to go on line as much of the time as possible. Thus, in addition to being designed with intrinsically high reliability, it is highly desirable for the system to detect malfunctions or other anomalous operating conditions, quickly shut down upon a malfunction to prevent damage or unsafe operating conditions, and be quickly repaired if necessary and returned to service. To this end, power monitor means 130 and 132 also monitor for failures or other anomalous operating conditions manifested in distribution lines 6 and in the generator output, and generate alarm outputs upon detection of such conditions. As has been noted, monitor means 130 and 132 function as intelligent slaves to CPU 110 and thus desirably comprise ROM and RAM for program and data storage and a CPU for control and execution. Monitor means 130 and 132 generate alarm outputs D6 and D7 in response to overvoltage, undervoltage, improper phase sequence, current imbalance, overfrequency, underfrequency, reverse power, and overcurrent conditions in the monitored lines, by comparison of data representing the monitored conditions derived from the voltage and current sensors with stored alarm limit setpoint data. If the line phase sequence is not 1-2-3, an alarm is immediately generated. For each of the other monitored conditions set forth above, data representing a setpoint value and a trip time value is stored in RAM. Data representing the value of the monitored condition, derived from the voltage and current input signals, is compared with the stored setpoint value. If the comparison indicates an alarm condition, a trip timer is started. If the monitored condition recovers from the alarm condition before the trip timer times out, the trip timer is reset and no alarm output is generated. If the trip timer times out before the monitored condition recovers, an alarm output signal is generated, and data representing the monitored condition which caused the alarm is provided to bus 158 when the monitor means is polled by CPU 110. Alarm data is stored in RAM 114 together with the time of the alarm. Upon occurrence of an alarm, cogenerator control action is taken in a manner discussed more fully hereinafter. Desirably such control action includes immediately decoupling generator 14 from the distribution lines. As with the governor controller 120, this is desirably accomplished by providing an interlock comprising power monitor-controlled relay contacts in series with the coil of contactor 50. With such apparatus, control means 160 is apprised of an alarm detected by governor controller 160 or monitor means 130 or 132 when it scans discrete output D2 indicating the contactor state. If CPU 110 did not generate the output to contactor 50 to decouple the generator, it polls the governor controller and monitor means to determine which of them did and the alarm conditions which caused the decoupling action. CPU 110 may also be apprised of the occurrence of an alarm by governor controller 160 or monitor means 130 or 132 when scanning discrete inputs D3, D6, and D7, respectively.

For the overcurrent condition, instead of a fixed trip time stored in RAM, desirably the trip time varies inversely according to the degree to which the measured current exceeds the overcurrent setpoint. Such variable trip times may be computed or derived from stored data in response to an overcurrent condition. In this way, larger overcurrent conditions generate an alarm more quickly than smaller overcurrent conditions.

In addition to protection of the cogeneration system, the above-described condition monitoring functions enable the cogeneration system of the present invention to satisfy utility interface requirements. Utilities have the right to establish interface specifications required of generating equipment connected to their lines. Such interface specifications generally include requirements for the monitored conditions described above, including setpoints and trip time parameters within which the equipment must be disconnected from the line in the event of a fault. Compliance with such specifications has in the past generally been accomplished by electromechanical protective relays. This solution is expensive since such relays are quite costly, and large numbers of them are required to monitor all conditions. In contrast, implementing such functions electronically in the supervisory means of the present invention is relatively inexpensive, and may be expected to enjoy the superior reliability and accuracy of electronic devices over electromechanical devices. Further, since the setpoints, trip times, and other parameters for generating an alarm are stored in RAM and thus may be altered at will, the control means 160 of the present invention is easily configured and reconfigured to comply with utility interface specifications or other requirements.

In addition to measuring the customer loop temperature and flow, line voltage and current, and engine RPM variables as described above, the supervisory means 16 of the present invention also comprises means for monitoring other cogenerator operating condition variables for purposes of system control, detection of anomalous or faulty operating conditions, and system diagnosis. The system of FIG. 2 includes intermediate loop temperature sensors 66 and 68 providing analog outputs A3 and A4, low and high pressure sensors 70 and 72 providing discrete outputs D10 and D11, and low flow sensor 74 providing discrete output D12. It further includes engine sensors including coolant temperature sensor 82 providing analog output A5, oil temperature sensor 84 providing analog output A6, engine compartment air temperature sensor 86 providing analog output A7, oil pressure sensor 88 providing analog output A8, vibration sensor 90 providing analog output A9, low coolant flow sensor 92 providing discrete output D8, and low oil level sensor 94 providing discrete output D9. The system of FIG. 2 further includes battery voltage sensor 76 providing analog output A10, and generator high temperature sensor 78 providing discrete output D4. As has been noted, a discrete output D2 is provided from contactor 50 to indicate its state and interlock outputs D3, D6, and D7 are provided from governor controller 120 and monitoring means 130 and 132 to indicate their alarm state. Finally, the air temperature of a housing containing the electronic components comprising control means 160 may be measured by temperature sensor 86 providing analog output A12. Desirably the electronic components comprising control means 160 are CMOS components, whose low power consumption will minimize the likelihood of component-generated heat causing an overtemperature problem.

As has been indicated, the analog and discrete outputs of the sensors are coupled to analog and digital input means 122 and 124, whose outputs are periodically and repetitively scanned by CPU 110. Also coupled to digital input means 124 are two push button switch inputs. Switch 51 provides an emergency stop input D1 enabling an operator to shut down the cogenerator. Reset switch S2 enables an operator to reset CPU 110.

Control means 160 also comprises a set of mode switches S3-S10 which permit an operator to operate and control the system through switch actuation as well as through data entry at the keyboard of local terminal I/O means 134. S4 is an on-off switch for the supervisory means 16; when on, the system functions autonomously according to its inputs and control program. S5 when actuated places the system in a maintenance mode, enabling operation via the following switches. S10 actuates circulating pump 148 to ensure engine cooling when the system is operated in the maintenance mode. S9 actuates ignition means 45 and fuel control means 48, and S8 actuates starter means 44 to start engine means 12. S7 actuates contactor 50 to couple and decouple the generator means 14 from the line. S3 selects the automatic or maximum operating mode. S6 enables the performance of testing operations. Switches S3-S10 are coupled to bus 158 by switch input means 126, which provides signal conditioning such as optical isolation of the switch inputs. While switches S1-S10 are shown unconnected on one end, it will be understood that they are each provided with other circuitry to convert the switch closure conditions into detectable signals. For instance, such other circuitry may comprise a connection to a power supply potential and current limiting resistance in series with an optical isolator input LED.

Autonomous operation of the system will now be described. If means engine 12 is stopped and conditions occur requiring starting, such as the time approaching a peak demand interval or heat being required by thermal load 18, then certain start-permissive inputs are compared with stored data to ensure that the cogenerator may be started and connected on line. Such inputs include intermediate loop flow, engine oil level, and utility alarms. If such inputs are proper, control signals are output by output driver means 128 to starter means 44 to crank the engine means 12, to enable ignition means 145, and to fuel control 48 to supply fuel to the engine means. If the RPM input exceeds a predetermined amount within a predetermined time, the engine has been successfully started, and stored data for the number of engine starts may be incremented. If starting has not been successful, the system is returned to the off state and, after a predetermined wait interval, may be attempted to be restarted. After starting, the engine is idled for a predetermined period to ensure that it has been successfully started. CPU 110 then increases its speed setpoint output, and the fuel control output of governor control 120 is thus varied to accelerate engine means 12 until the RPM input indicates that generator means 14 is at line synchronous speed. CPU 110 then causes output driver means 128 to provide an output to contactor 50 causing it to close, bringing the cogenerator on line. Stored data for the number of on-line events may be incremented. The engine is then idled at line synchronous speed, to warm it up, until the sensed engine coolant temperature exceeds a predetermined amount. When this occurs, a fuel control output is generated to increase the speed of engine means 12 above line synchronous speed, thus causing generator means 14 to deliver electrical power to line 8, in accordance with inputs pertinent to the operating control mode of the system, i.e. control of the thermal output or control of the electrical output of the cogenerator in the automatic or maximum mode. When such inputs indicate that the cogenerator should be brought off line, this may be accomplished by essentially the reverse of the above procedure. Stored data representing engine running time may then be updated.

While engine means 12 is being operated, the analog and digital inputs and the data inputs from monitor means 130 and 132 are continuously repetitively scanned and stored. These inputs are also compared with stored data indicating alarm limits for the operating conditions related to the inputs. If such a comparison indicates that an alarm condition, i.e. a malfunction or anomalous operating condition, exists, then data is stored indicating the nature of the alarm condition and the time of its occurrence. Also, one of three types of control action is taken, depending on the nature of the alarm condition occurring. Alarm conditions corresponding to the three types of control action may be generally categorized as engine, generator, and utility faults. For engine faults, generator means 14 is immediately disconnected from the distribution lines by a control output from driver means 128 to open contactor 50, and engine means 12 is immediately stopped by a control output to fuel control means 48 to cut off fuel to engine means 12. For generator faults, generator means 14 is immediately disconnected from the distribution lines and engine means 12 is shut down in a controlled fashion, essentially the reverse of the previously described procedure whereby the cogenerator is brought on line. For utility faults, generator means 14 is immediately disconnected from the distribution lines, engine means 12 is idled at synchronous speed, and a timer is started. If within a predetermined stored time interval the utility fault has cleared, a reconnect attempt is made by closing contactor 50 and accelerating engine means 12, in the manner previously described. If the utility fault has not cleared within the predetermined time, acontrolled shutdown of engine means 12 is effected. Utility faults include faults in the operating conditions monitored by utility power monitor means 132. Generator faults include faults in the operating conditions monitored by generator power monitor means 130 and generator temperature sensor 78. Other faults which result in the generator fault control action are low intermediate loop flow monitored by sensor 74, high intermediate loop temperature monitored by sensor 66, high and low intermediate loop pressures monitored by sensors 66 and 74, and high intermediate loop supply temperature monitored by sensor 66. Engine faults include low oil pressure or level or high oil temperature monitored by sensors 88, 94 and 84, engine overspeed or underspeed monitored by sensor 96, low coolant flow or high coolant temperature monitored by sensors 92 and 82, high engine vibration monitored by sensor 90, and high engine compartment air temperature monitored by sensor 86. Also resulting in engine fault control action is actuation of emergency stop pushbutton S1.

As has been mentioned, operating condition data measured by the sensors or derived from such measurements is periodically stored in RAM 114. Such operating condition data may be in the form of present values and/or values accumulated or averaged over a time interval, and may be stored in association with data representing the time at which such data was obtained. Desirably the operating condition data includes the data in the categories set forth below.

An alarm history log includes data representing the times of occurrence and nature of alarm condition for each alarm detected by supervisory means 16. Data representing the number of occurrence of each alarm condition may also be stored.

An operational history log includes data representing operationally significant events, the times of occurrence of such events, and the reasons for (operating conditions causing) such events. Such events include starting and stopping of engine means 12.

An energy/power log includes data representing the energy and/or power supplied by the utility and cogenerator and demanded by the site loads. Electrical data is desirably stored in four categories, relating to utility peak, intermediate, and off-peak hours, and a total. Such data is desirably stored once per day and maintained in a queue containing data for a predetermined number of previous days. Such data includes data for the previous day and desirably also contains cumulative and peak data occurring over a predetermined number of previous days. Such data includes the electrical energy supplied by the utility and by generator means 14, and may include the electrical energy consumed by the load 4. It further includes data representing the thermal energy supplied to load 18 by the cogeneration system. It further includes the peak electrical power demand of load 4, and the peak demand occurring when the cogeneration system was off-line. Also desirably included in the energy/power log is a site load profile, consisting of the power demand of load 4 for the previous day at periodic sampling intervals, such as at 15 minute intervals.

As has been noted, RAM 114 contains data representing the rate structure of the utility servicing the cogenerator site. Such data includes the times at which peak, intermediate, and off-peak energy rates are in effect, and the times at which peak power demand is measured by the utility for purposes of direct charges based on peak demand or adjustments to energy rates based on peak demand. If RAM 114 includes data representing the rates and charges applicable to various utility energy consumption and power demand conditions, then CPU 110 may compute and RAM 114 may store in the energy/power log data representing the electrical energy charges which the utility would have billed to the site had the cogeneration system not been in place, and the electrical energy charges which the utility will bill to the site based on its actual power and energy demand from the utility. The difference between such charges represents the electrical energy cost savings effected by operation of the cogeneration system. Of course, such rate and charge data need not be stored in RAM 114; the electrical energy charges and savings described may be computed elsewhere based on the other data stored in the power energy log. Similarly, the alarm history, operating condition, and energy/power logs need not be stored in RAM 114 but may maintained elsewhere in a remote memory in accordance with data transmitted by supervisory means 16 as it is obtained. However, while such remote storage is functionally equivalent to storage in RAM 114, it is preferable to store such data in RAM 114 where it may be accessed locally during cogenerator diagnosis, maintenance, and testing as well as remotely accessed.

Supervisory means 16 includes three input/output (I/O) means for data interchange with control means 160. Local terminal I/O means 134 comprises keyboard means for supplying data to bus mean 158 and display means for displaying data present on bus means 158. Remote I/O means 138 comprises means for coupling bus 158 with a communication channel 166 for data interchange with a remote terminal or computer. Communication channel 166 may be a telephone or radio channel, in which cases remote I/O means 138 will comprise a telephone or radio modem. I/O means 134 and 138 enable a local or remote operator to access and display stored data representing the present measured or computed operating condition variables of the cogeneration system, as well as data in the alarm, operational history, and energy/power logs. Also via the I/O means, stored data representing cogeneration system set-up parameters may be displayed and altered if desired by an operator to reconfigure the system. Such set-up parameters may include cogenerator specifications, such as its rated voltage, current, power, and speed. They may also include calibration data relating to the sensors. The set-up parameters may further include alarm set points or alarm states for the analog and discrete operating conditions monitored by control means 160. The setup parameters may also include control parameters for the various possible operating modes of the system, such as parameters for proportional-integral-derivative control of the thermal or electrical output. In addition to display of operating conditions and the like upon input by an operator requesting same, the control means 160 also automatically generates alarm outputs, at local terminal 134 and at a remote terminal via remote I/O means 138, immediately upon detection of an alarm condition. This enables an operator to immediately take steps to return the cogeneration system to proper operational condition. This may be extremely important where, for instance, a utility peak demand measuring period is upcoming; if the cogeneration system is not returned to service prior to the start of such period, a large peak demand supplied solely by the utility during such period can radially affect utility charges for a month or for a year. In such circumstance, the ability to learn of an alarm at a remote location and to diagnose the cogeneration system by displaying the stored data and by operating the system is extremely important. For instance, many alarms may turn out to be false alarms or alarms not preventing the system from being placed on line. In such circumstances, an operator may determine such and supply inputs in order to return the system to service from a remote location, saving the time and expense of a service trip to the site and avoiding the possibility of an unnecessary high utility-supplied peak. If an alarm is determined to in fact be due to a defective system component, then the nature of such defect may be remotely determined and repair personnel quickly dispatched to the site prepared to remedy the detected fault. In this manner, the cogeneration system of the present invention provides means for maintaining the system available on line with a high degree of reliability.

FIG. 3 shows schematically the preferred embodiment of power monitoring means 130 and 132 of FIG. 2. The secondary winding 186 of a potential transformer coupled to phase 1 of the monitored lines provides a voltage signal $v_1$ representing the voltage on phase 1 of the monitored lines. The secondary winding 188 of a current transformer coupled to phase 1 of the monitored lines provides a current signal $i_1$ representing the current in phase 1 the monitored lines; $i_1$ flows through resistance 190, generating a voltage signal proportional to $i_1$ which voltage signal is buffered by amplifier 192 to generate a low-impedance voltage signal proportional to $i_1$ designated $i_1^*$. The $v_1$ and $i_1^*$ signals are applied to the inputs of a four-channel differential multiplexer 170. Multiplexer 170 couples pairs of inputs 1A and 1B, 2A and 2B, etc. to the outputs A and B in accordance with the selection signals 00, 01, etc. present at inputs S0, S1. The outputs A, B of the multiplexer 170 are coupled to the inputs of analog multiplier 172. Because inputs 1A and 1B are both coupled to $v_1$, when these inputs are selected the output of multiplier 172 is proportional to $v_1 \times v_1$. Similarly, because inputs 3A and 3B are both coupled to $i_1^*$, when these inputs are selected the output of multiplier 172 is proportional to $i_1^* \times i_1^*$. When inputs 2A and 2B are selected, the output of multiplier 172 is proportional to $v_1 \times i_1^*$. Selection of inputs 4A and 4B, both coupled to circuit common, enables a reference output to be generated which may be used to compensate for measurement errors introduced by the circuit components.

The product output of multiplier 172 is coupled to the input of voltage-to-frequency (V/F) converter 174, which is provided with a clock input from clock 194. The output of V/F converter 174, a series of clock pulses whose frequency is proportional to the voltage input to converter 174, is coupled to the input of a counter 176. Counter 176 is gated by a gating input G derived from the $v_1$ signal. The gating signal is a square wave signal at half the line frequency and is generated by squaring means such as hysteresis amplifier 178 and binary divider 180. Thus the counter accumulates over each line period a count proportional to the integral of the product output of multiplier 172 over such line period. The counter output is supplied to the data bus of microcontroller 182, which may be an 80C31 microcontroller which comprises CPU, RAM, ROM, and other functions including an 8-bit I/O port, two bits of which are used to generate the S0 and S1 selection signals. Microcontroller 182 computes the square root of the count output from counter 176.

Thus, by selecting the $v_1$ and $i_1$ signals as described, multiplying them in multiplier 172, integrating them in V/F converter 174 and counter 176 over one line period, and taking the square root in microcontroller 182, the power monitoring circuitry shown in FIG. 3 computes in one period the RMS voltage, current, or power present on phase 1.

The phase 1 RMS voltage, current, and power data is compared with setpoint data stored in microcontroller 182 to detect overvoltage, undervoltage, reverse power, and overcurrent alarm conditions for phase 1. The phase 1 components within the dotted block are duplicated for phases 2 and 3 so as to monitor the RMS voltage, current, and power (and corresponding alarm conditions) of these phases also. Desirably counter 176 comprises three counters whereby one component may provide the counting function for all phases, an address signal from microcontroller 182 selecting which counter is coupled to the data bus; otherwise, the counting function provided by counter 176 must be duplicated for phases 2 and 3 by other means.

The gating signal output from binary divider 180 is also coupled to the input T0 of a gated timer included in microcontroller 182. The gated timer provides high resolution data representing the period of phase 1, which is compared with alarm limit setpoint data to detect overfrequency and underfrequency alarm conditions.

Secondary winding 196 of a potential transformer coupled to phase 2 is coupled to squaring means 198 such as a hysteresis amplifier to provide a square wave output in phase with the voltage of phase 2. The output of squaring means 198 is coupled to one bit of the I/O port of microcontroller 182 and its state determined at transitions of the gating signal derived from $v_1$. The state of the output of squaring means 198 at the gating signal transitions indicates whether $v_2$ is leading or lagging $v_1$, and thus indicates whether the phase sequence of the monitored lines is proper. If improper, an alarm output is immediately generated.

The $i_1^*$ output of amplifier 192 is coupled to another squaring means 194 such as a hysteresis amplifier to generate a square wave output signal in phase with $i_1$ which is coupled to another bit of the I/O port of microcontroller 182. Microcontroller 182 computes the phase angle of the phase 1 power by comparing the transition times of the phase 1 voltage and current signals. With phase angle data, microcontroller 182 may compute the real power, imaginary power, KVA, and power factor of phase 1.

Microcontroller 182 and CPU 110 may operate asynchronously; I/O buffer means 184 is provided to permit data interchange between the two processors. Buffer means 184 comprises a pair of one-byte FIFO buffers into which each of the processors can deposit data for transfer to the other, and means for interrupting the non-depositing processor and presenting the deposited data to its data bus.

Figure 4:
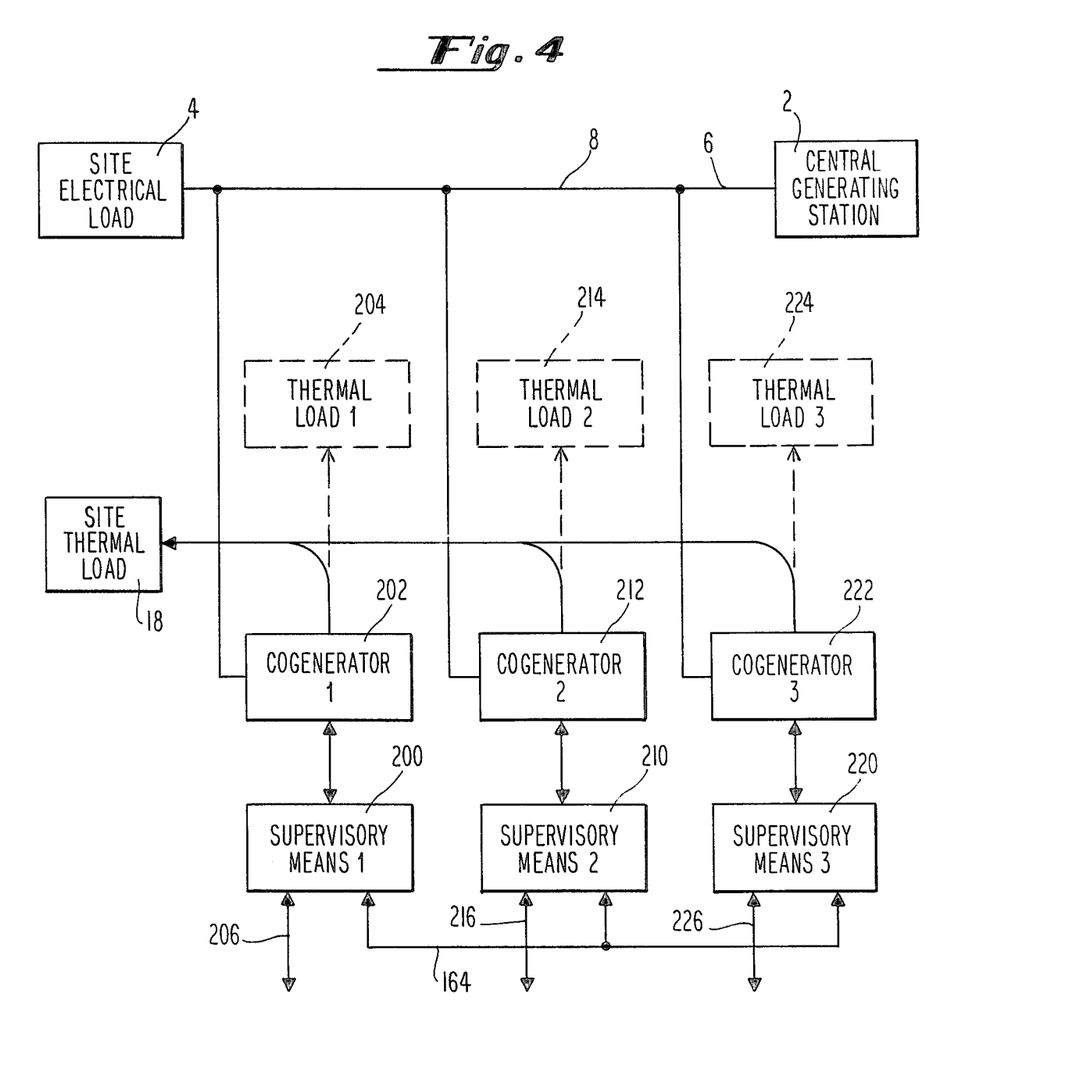
FIG. 4 is a schematic diagram of a cogeneration system according to the invention which includes a plurality of cogenerators.

The power monitor circuitry of FIG. 4 further includes interlock means 199, which receives an alarm output from one bit of the I/O port of microcontroller 182 upon the occurrence of any alarm. Interlock means 199 comprises relay means including a pair of contacts coupled in series with the coil of contactor 50, whereby the power monitor means may immediately decouple generator means 14 from the line upon an alarm. Interlock means 199 further may comprise means for generating a discrete output (D6 or D7 in FIG. 2) upon the occurrence of an alarm, enabling CPU 110 when scanning discrete input means 124 to determine which interlock experienced an alarm causing the system to go off line; if a power monitor interlock was responsible, CPU 110 may poll the responsible monitor means via I/O buffer 184 to determine the cause of the alarm.

The power monitor means of FIG. 4 enables acquisition and computation of all of the above-described electrical data and determination of the above-described alarm conditions, for all phases, in a period of 0.1 second. As described, the RMS voltage, current, and power measurements are each made over a 1-cycle period; counter 176 accumulates data for all 3 phases during the intervals where voltage, current, or power is measured. Thus, in a six line-period measuring cycle (e.g., voltage measurement; break; power measurement; break; current measurement; break) controlled inter alia by selection signals S0 and S1, the FIG. 4 apparatus makes all necessary measurements and may make all necessary computations and comparisons to perform the monitoring functions set forth for power monitor means 130 and 132. At the 60 Hertz line frequency of the North American grid, the six line-period cycle is completed in 0.1 second. Because this time is shorter than all known utility interface specifications for the time within which connected cogeneration equipment must the disconnected from the line in the event of a fault, the FIG. 4 apparatus is capable of responding to the line faults herein described to meet utility specifications without requiring numerous and expensive electromechanical protective relays.

FIG. 4 shows a block diagram of a cogeneration system according to the present invention which comprises a plurality of cogenerators 202, 212, 222 each controlled by a supervisory means 200, 210, 220. Such multiple cogenerator systems are desirable where the output of a single cogenerator is insufficient to satisfy site normal demand, or where wide dispersal of thermal loads at a site renders it inconvenient or uneconomical to supply them from a single cogenerator. In such a multiple cogenerator system, each cogenerator supplies power to a common thermal load 18 (or, as shown in phantom, to an assigned thermal load 204, 214, 224) and supplies electrical power to the site distribution lines 8 to support the electrical load 4 thereon. Each cogeneration unit (cogenerator and supervisory means) is constructed as shown in FIGS. 1 and 2. Each cogeneration unit comprising the system is coupled to the others by local area network (lan) communication channel 164 to enable data interchange between the component units, and control of the system in a coordinated fashion. Each cogenerator unit in the system transmits data to and receives data from the lan communication channel via its lan I/O means 136. Operation of the multiple-cogenerator system will now be described.

When the multiple-cogenerator system is initialized, a unique identifying number (1, 2 and 3 in FIG. 4) is stored in memory in each cogeneration unit, as well as a number designating the total number of units on site. Also, data is stored in each unit designating it as lan master or slave; one unit is designated as the lan master unit, and the others are designated as slaves. The lan master accumulates power and energy output data and status data (on, off or alarm) from all units comprising the system. This is accomplished by periodic polling by the lan master of each cogeneration unit. The lan master also determines the operating modes for itself and each other unit, as follows. One unit is designated, by command from the lan master, as the lead unit. The lead unit is responsible for regulation of system output, either thermal or electrical depending on stored input from an operator. The designated lead unit accomplishes this regulation by operating in the automatic mode, i.e. varying its output in response to thermal or electrical feedback signals so as to achieve the system output required to satisfy the load requirements. If more output is required than can be supplied by the lead unit, as determined by the lan master when polling the lead unit, then the lan master transmits data over lan communication channel 164 to the next unit in numerical order instructing the next unit to turn on and operate in the maximum mode. For instance, if unit 2 is the lead unit and is incapable of supplying system demand, the lan master will transmit data instructing unit 3 to turn on; unit 3 will operate at maximum output, and unit 2 will operate in the automatic mode, adjusting its output so that the combined output of units 2 and 3 satisfies the load demand. If demand increases beyond that which can be supported by all operating units at maximum output, additional units are turned on in numerical order in the maximum mode until the lead unit can provide regulation. For instance, if units 2 and 3 cannot support the load, unit 1 will be turned on in the maximum mode, and unit 2 will continue to adjust it output to regulate system output. As load decreases, the lan master outputs data instructing units to turn off, as required, in the reverse of the order in which they were turned on, until the lead unit is able to regulate system output.

The lan master unit periodically, such as on a daily basis, changes the designation of the lead unit, rotating the lead designation through the units of the system in numerical order. This feature tends to equalize run time and consequent wear among the units of the system.

In the system of FIG. 4, the individual units function sequentially, to control operation of the system. It thus differs from distributed control schemes, wherein control is simultaneously shared by more than one unit; from central control schemes, wherein a dedicated supervisory controller controls operation of multiple cogenerators; and from an assemblage of units at a site each of which is autonomous and which do not function together as a system. A particular advantage of such a system according to the present invention is that an extremely wide range of site demands may be accommodated with merely one design of cogeneration unit, merely by selecting the number of units required to satisfy site demand, coupling them together via their lan communication channel 164, and initializing them as described. Further, an installed system may be easily expanded or contracted to accommodate changing site demand.

Desirably the lan master also controls all communication with a remote terminal via its remote I/O means 138, as well as between component units of the system. If one component unit enters the alarm state, the lan master transmits alarm information to the remote terminal. A remote operator can access data from the alarmed unit and transmit data thereto through the lan master's remote I/O means 138 and the lan I/O channel 164, or alternatively, directly from and to the alarmed unit via its remote I/O means 138. The lan master, in selecting the next unit in sequence to turn on or to assume lead unit status, bypasses units in the alarm state; provided that remaining units can satisfy site demand, the failure of one or more cogenerators does not affect the ability of the system to regulate its output as required.

The system of FIG. 4 provides further advantages upon failure of the supervisory means of a lan master. All units in the system of FIG. 4 desirably monitor the frequency of occurrence of polls by the lan master. If within a predetermined amount of time, e.g. 5 polling periods, the other units have not been polled, it may be assumed that the lan master supervisory means is defective. In such circumstances, the next unit in sequence designates itself as lan master and assumes the role thereof previously described. (It may also cause local and remote alarm indication) As all units are identical (except for identifying designation, and designations as lan master or lead unit) in structure and programming, they are each capable of being designated lan master and performing the lan master function. Thus, so long as enough units of the system to support the demand are functional, the system will continue to properly regulate its output despite failures in the supervisory means and/or cogenerators of all other unit.

In addition to providing the benefits described herein for a site owner who owns a cogeneration system, the system of the present invention enables cogeneration systems owned by others to be installed at a site. Because the system of the invention enables monitoring and documentation of the savings in electrical and thermal billings obtained by use of the system, the site owner may be billed by the cogeneration system owner based upon such savings. Thus custom engineering expenses, capital costs and the risk of uneconomical operation are avoided by the site owner, and the cogenerator owner may achieve economics of scale by providing a cogeneration system having one design of a standard unit to a large number of site owners. Remote collection of power and energy data enables centralized billing; remote collection of alarm data enables centralized fault monitoring and diagnosis, by well-trained and experienced operators, of all systems owned by the cogenerator owner.

While the preferred embodiment of the invention has been shown and described, modifications no doubt may be made by those skilled in the art without departing from the spirit and scope of the present invention.

What is claimed is:

1. A cogeneration system for producing thermal and electrical energy at a site having a thermal load and an electrical load coupled through electrical distribution to a utility central generating station comprising:
   cogeneration means including heat engine means, electrical generating means mechanically coupled to said engine means, electrical coupling means for coupling the electrical output of said generating means to said distribution lines, and heat transfer means for transferring heat from said engine means to said thermal load; and supervisory means for monitoring cogeneration system operating conditions and controlling cogeneration system operation, said supervisory means including
   electrical monitoring means for monitoring the electrical energy or power of said electrical load, said generating means, and said utility;
   real time clock means for providing real time data; and
   cogeneration control means for controlling the operation of said cogeneration system in response to said monitoring means and said clock means.

2. System according to claim 1, wherein said supervisory means comprises data storage means for retaining stored data, and said supervisory means stores data representing monitored operating conditions.

3. System according to claim 2, wherein said supervisory means comprises remote input/output means for transferring data between said supervisory means and a communication channel.

4. System according to claim 3, wherein said remote input/output means comprises a modem.

5. System according to claim 3, wherein said remote input/output means comprises radio transmitter/receiver means.

6. System according to claim 1, wherein said supervisory means comprises thermal monitoring means for monitoring the heat transferred between said engine means and said thermal load.

7. System according to claim 6, wherein said heat transfer means comprises means for circulating a fluid through a fluid circuit thermally coupled to said engine means and to said thermal load, and said thermal monitoring means comprises means for measuring the difference in temperature of said fluid circulated to and from said thermal load and means for measuring the flow of fluid through said fluid circuit.

8. System according to claim 2, wherein said stored data includes data representing the rate structure of said utility.

9. System according to claim 8, wherein said supervisory means controls operation of said cogeneration means in response to said utility rate structure data.

10. System according to claim 9, wherein said utility rate structure data includes data representing utility peak demand measuring periods, and said supervisory means controls operation of said cogeneration system in response to said rate structure data and said real time data.

11. System according to claim 10, wherein said utility rate structure data includes data representing the times at which different utility energy rates are in effect, and said supervisory means controls operation of said cogeneration system in response to said rate structure data and said real time data.

12. System according to claim 2, wherein said supervisory means controls the output of said generator means in response to monitored utility power data.

13. System according to claim 12, wherein said supervisory means controls the output of said cogeneration means so that the monitored utility power is substantially zero.

14. System according to claim 2, wherein said stored data includes data representing alarm limits for said monitored operating conditions, and said supervisory means compares said monitored operating condition data with corresponding alarm limit data and generates alarm outputs when said operation conditions exceeds corresponding alarm limits.

15. System according to claim 14, wherein said supervisory means generates remote alarm outputs via remote input/output means.

16. System according to claim 2, wherein said supervisory means comprises input/output means for entry and display of stored data.

* * * * *